US008346408B2

(12) United States Patent
Ratliff (10) Patent No.: US 8,346,408 B2
(45) Date of Patent: Jan. 1, 2013

(54) FAULT TOLERANT FLIGHT CONTROL SYSTEM

(75) Inventor: Ryan Todd Ratliff, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 1039 days.

(21) Appl. No.: 12/268,092

(22) Filed: Nov. 10, 2008

(65) Prior Publication Data

US 2010/0332052 A1 Dec. 30, 2010

(51) Int. Cl.
*G06F 17/00* (2006.01)

(52) U.S. Cl. ......... 701/8; 701/2; 701/3; 701/11; 701/13; 701/15; 700/28; 700/31; 244/82; 244/99.8; 244/185; 244/186; 244/203; 318/591; 318/580; 318/565; 340/961

(58) Field of Classification Search ................... 701/2, 3, 701/11, 13, 15, 24, 33, 58, 120; 244/82, 244/99.8, 185, 186, 203, 75.1, 76.1, 135 A, 244/136, 190; 342/32, 36, 411, 413; 318/591, 318/580, 565; 700/31, 28; 340/961
See application file for complete search history.

(56) References Cited

U.S. PATENT DOCUMENTS

| | | | | |
|---|---|---|---|---|
| 5,366,176 A * | 11/1994 | Loewy et al. | ................. | 244/99.8 |
| 6,923,403 B1 * | 8/2005 | Dizdarevic et al. | ............. | 244/13 |
| 6,984,833 B2 * | 1/2006 | Sano et al. | ................ | 250/492.21 |
| 7,079,937 B2 * | 7/2006 | Tanaka | ........................... | 701/102 |
| 7,177,739 B2 * | 2/2007 | Kuchler | ....................... | 701/29.6 |
| 7,212,917 B2 * | 5/2007 | Wilson, Jr | ..................... | 701/120 |
| 7,996,118 B2 * | 8/2011 | Seren et al. | ....................... | 701/3 |
| 2002/0018716 A1 * | 2/2002 | Kennedy et al. | ................ | 416/25 |
| 2004/0069904 A1 * | 4/2004 | Thal et al. | ................. | 244/135 A |
| 2005/0178193 A1 * | 8/2005 | Kuchler | .......................... | 73/146 |
| 2005/0278085 A1 * | 12/2005 | Warkomski et al. | ............. | 701/6 |
| 2008/0223141 A1 * | 9/2008 | Schmid et al. | .................. | 73/721 |
| 2008/0249670 A1 * | 10/2008 | Seren et al. | ....................... | 701/3 |

OTHER PUBLICATIONS

Aboky et al., "Observers for Lipschitz non-linear systems", International Journal of Control, 2002, vol. 75, No. 3, pp. 204-212.
Byers, "A Bisection Method for Measuring the Distance of a Stable Matrix to the Unstable Matrices", SIAM J. Sci. Stat. Comput. vol. 9, No. 5, Sep. 1988, pp. 875-881.
Pagilla et al., "Controller and Observer Design for Lipschitz Nonlinear Systems", Proceedings of the 2004 American Control Conference, Boston, Jul. 2004, pp. 2379-2384.
Rajamani et al., "Existence and design of observers for nonlinear systems: relation to distance to unobservability", Int. J. Control, 1998, vol. 69, No. 5, pp. 717-731.
Ratliff et al., "Fault Tolerant Robust Flight Control Using Surface Actuator Hinge Moments", 2008 American Control Conference, Jun. 2008, Seattle, WA, pp. 1612-1617.

* cited by examiner

*Primary Examiner* — James Trammell
*Assistant Examiner* — McDieunel Marc
(74) *Attorney, Agent, or Firm* — Yee & Associates, P.C.

(57) ABSTRACT

A method, apparatus, and computer program product for identifying a number of air states for a vehicle. A deflection of a control surface associated with an actuator is identified to form an identified deflection. A current in the actuator is identified to form a measured current. The number of air states for the vehicle is estimated using the identified deflection and the measured current.

20 Claims, 7 Drawing Sheets

FAULT TOLERANT FLIGHT CONTROL SYSTEM

BACKGROUND INFORMATION

1. Field

The present disclosure relates generally to an improved data processing system and, in particular, to a method and apparatus for controlling a vehicle.

2. Background

Aerial vehicles may include navigation systems to guide these types of vehicles without direct and/or continuous human control. Navigation systems generate information used to guide an aerial vehicle. This information may be used by a human operator and/or a guidance system.

Both types of systems require airframe state data to operate the aerial vehicle. Airframe state data describes various parameters about an aerial vehicle around the aerial vehicle during flight. This airframe state data is used by pilots and/or guidance systems to make operational decisions and control actions regarding an aerial vehicle. Airframe state data may include, for example, total pressure, static pressure, angle of attack, angle of side slip, surface velocity, pitch rate, and/or other suitable airframe data.

An inertial measurement unit (IMU) is an example of one device that may be used to obtain some types of air data. An inertial measurement unit generates data that allows a guidance system or navigation system to track the position of an aerial vehicle. An inertial measurement system detects the current rate of acceleration along with other rotational attributes. These rotational attributes include, for example, pitch, roll, and yaw. This information is used to calculate a current position for an aerial vehicle.

With aerial vehicles, it is desirable to have backups or alternative methods to identify the position of an aerial vehicle if an inertial measurement unit fails and/or becomes less reliable. Less reliable data and/or failure of inertial measurement units may cause an aerial vehicle to miss a destination. For example, a second inertial measurement unit may be included in the aerial vehicle to provide redundancy. Inertial measurement units, however, add to the weight and/or expense of an aerial vehicle.

Although redundant systems or additional inertial measurement units may be present, this type of redundancy may reduce a payload of an aerial vehicle and may increase the cost for producing the aerial vehicle.

An inertial measurement unit may become less reliable on a temporary basis if the dynamics of the aerial vehicle exceeds the sensor range of the particular inertial measurement unit. For example, a sensor in the inertial measurement unit may be unable to measure a boost phase of an aerial vehicle such as, for example, a missile or a rocket. The acceleration may be so high that the sensor becomes useless for a period of time until the acceleration level decreases.

Therefore, it would be advantageous to have a method and apparatus to overcome the issues described above, as well as possible other issues.

SUMMARY

In one advantageous embodiment, a method is present for identifying a number of air states for a vehicle. A deflection of a control surface associated with an actuator is identified to form an identified deflection. A current in the actuator is identified to form a measured current. The number of air states for the vehicle is estimated using the identified deflection and the measured current.

In another advantageous embodiment, an apparatus comprises an actuator and an air state estimation process. The air state estimation process is capable of receiving a deflection of a control surface associated with the actuator from the actuator to form an identified deflection. The air state estimation process is capable of receiving a current measurement identifying a current in the actuator to form a measured current. The air state estimation process is capable of estimating a number of air states for the vehicle using the identified deflection and the measured current.

In another advantageous embodiment, a computer program product is present for identifying a number of air states for a vehicle. The computer program product comprises a computer recordable storage medium and program code stored on the computer recordable storage medium. Program code is present for identifying a deflection of a control surface associated with an actuator to form an identified deflection. Program code is present for identifying a current in the actuator to form a measured current. Program code is also present for estimating the number of air states for the vehicle using the identified deflection and the measured current.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
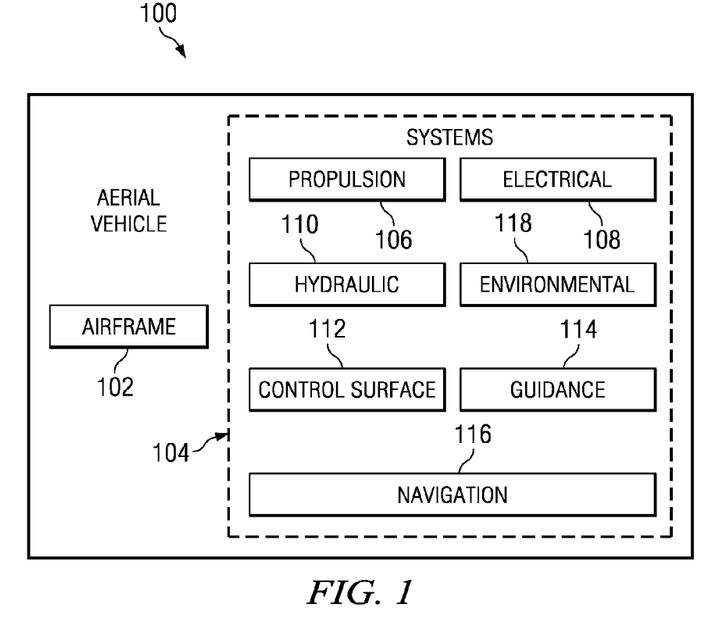
FIG. 1 is a diagram of an aerial vehicle in accordance with an advantageous embodiment.

With reference now to the figures and, in particular, with reference to FIG. 1, a diagram of an aerial vehicle is depicted in accordance with an advantageous embodiment. In this example, aerial vehicle 100 is an example of an aerial vehicle in which different advantageous embodiments may be implemented.

Aerial vehicle 100 has airframe 102 with systems 104. Systems 104 may include, for example, propulsion system 106, electrical system 108, hydraulic system 110, control surface system 112, guidance system 114, navigations system 116, and environmental system 118. Any number of other systems may be included, and some of the illustrated systems may be omitted, depending on the particular implementation. For example, with unmanned vehicles, environmental system 118 may be omitted. In yet other advantageous embodiments, systems 104 also may include a weapons system.

Advantageous embodiments may be implemented in navigation system 116 to provide airframe state data. Airframe state data may be any state of the aerial vehicle that can be measured and/or extrapolated for an aerial vehicle during flight. Airframe state data may include, for example, angle of attack, angle of side slip, pitch rate, attitude, pitch, roll, yaw, roll rate, yaw rate, side slip, and other suitable information.

The illustration of aerial vehicle 100 in FIG. 1 is not meant to imply physical or architectural limitations to the manner in which different advantageous embodiments may be implemented. For example, other components, in addition to or in place of the ones illustrated, may be employed, depending on the particular implementation. Further, aerial vehicle 100 may take various forms such as, for example, an aircraft, a missile, a rocket, an unmanned aerial vehicle, or some other suitable type of aerial vehicle.

Figure 2:
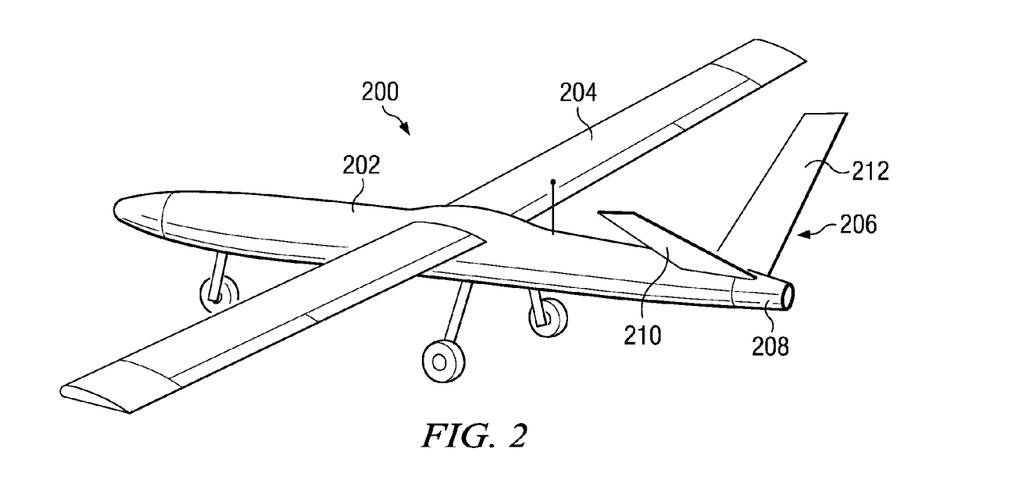
FIG. 2 is a diagram illustrating an aerial vehicle in accordance with an advantageous embodiment.

With reference now to FIG. 2, a diagram illustrating an aerial vehicle is depicted in accordance with an advantageous embodiment. Aerial vehicle 200 is an example of one implementation of aerial vehicle 100 in FIG. 1. In this example, aerial vehicle 200 takes the form of a fixed wing aircraft. Aerial vehicle 200 has fuselage 202. Wings 204 are attached to fuselage 202. Aerial vehicle 200 also has tail 206 and engine 208.

The movement of aerial vehicle 200 may be controlled through control surfaces, such as control surface 210 and control surface 212, on tail 206. Movement of aerial vehicle 200 may be through X-axis 214, Y-axis 216, and/or Z-axis 218. These axes form the lateral, longitudinal, and directional planes. In this example, the longitudinal plane reflects rotation about Y-axis 216 or movement in the X-Z plane. The lateral plane reflects rotation about X-axis 214 or movement in the Y-Z plane. The directional plane reflects rotation about Z-axis 218 or movement in the X-Y plane.

Figure 3:
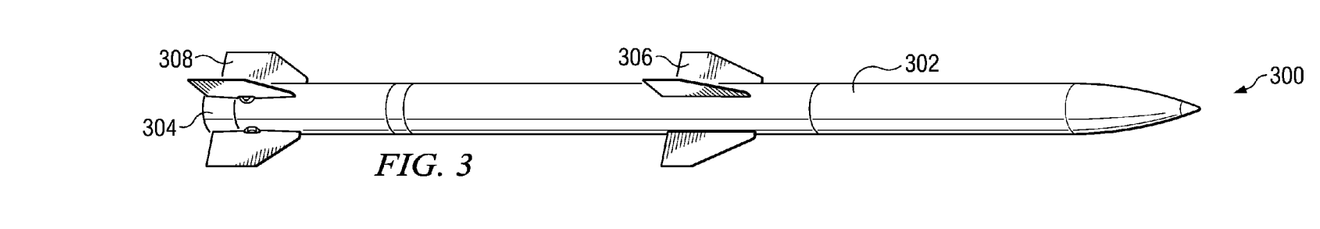
FIG. 3 is a diagram of an aerial vehicle in accordance with an advantageous embodiment.

With reference now to FIG. 3, a diagram of an aerial vehicle is depicted in accordance with an advantageous embodiment. In this example, aerial vehicle 300 is another example of an implementation of aerial vehicle 100 in FIG. 1. Aerial vehicle 300 takes the form of a missile, in this example. Aerial vehicle 300 has body 302, engine 304, fins 306, and fins 308. In these examples, fins 308 may function as control surfaces to guide the movement of aerial vehicle 300 during flight.

Figure 4:
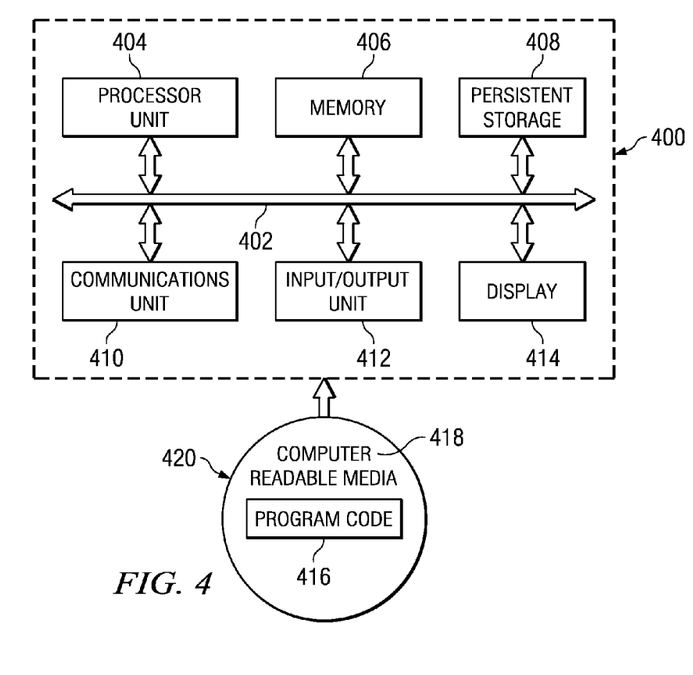
FIG. 4 is a diagram of a data processing system in accordance with an illustrative embodiment.

Turning now to FIG. 4, a diagram of a data processing system is depicted in accordance with an illustrative embodiment. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices. A storage device is any piece of hardware that is capable of storing information either on a temporary basis and/or a permanent basis. Memory 406, in these examples, may be, for example, a random access memory or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output unit 412 allows for input and output of data with other devices that may be connected to data processing system 400. For example, input/output unit 412 may provide a connection for user input through a keyboard and mouse. Further, input/output unit 412 may send output to a printer. Display 414 provides a mechanism to display information to a user.

Instructions for the operating system and applications or programs are located on persistent storage 408. These instructions may be loaded into memory 406 for execution by processor unit 404. The processes of the different embodiments may be performed by processor unit 404 using computer implemented instructions, which may be located in a memory, such as memory 406. These instructions are referred to as program code, computer usable program code, or computer readable program code that may be read and executed by a processor in processor unit 404. The program code in the different embodiments may be embodied on different physical or tangible computer readable media, such as memory 406 or persistent storage 408.

Program code 416 is located in a functional form on computer readable media 418 that is selectively removable and may be loaded onto or transferred to data processing system 400 for execution by processor unit 404. Program code 416 and computer readable media 418 form computer program product 420 in these examples. In one example, computer readable media 418 may be in a tangible form such as, for example, an optical or magnetic disc that is inserted or placed into a drive or other device that is part of persistent storage 408 for transfer onto a storage device, such as a hard drive that is part of persistent storage 408. In a tangible form, computer readable media 418 also may take the form of a persistent storage, such as a hard drive, a thumb drive, or a flash memory that is connected to data processing system 400. The tangible form of computer readable media 418 is also referred to as computer recordable storage media. In some instances, computer readable media 418 may not be removable.

Alternatively, program code 416 may be transferred to data processing system 400 from computer readable media 418 through a communications link to communications unit 410 and/or through a connection to input/output unit 412. The communications link and/or the connection may be physical or wireless in the illustrative examples. The computer readable media also may take the form of non-tangible media, such as communications links or wireless transmissions containing the program code.

In some illustrative embodiments, program code 416 may be downloaded over a network to persistent storage 408 from another device or data processing system for use within data processing system 400. For instance, program code stored in a computer readable storage medium in a server data processing system may be downloaded over a network from the server to data processing system 400. The data processing system providing program code 416 may be a server computer, a client computer, or some other device capable of storing and transmitting program code 416.

The different components illustrated for data processing system 400 are not meant to provide architectural limitations to the manner in which different embodiments may be implemented. The different illustrative embodiments may be implemented in a data processing system including components, in addition to or in place of those illustrated, for data processing system 400.

Other components shown in FIG. 4 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 418 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406, or a cache such as found in an interface and memory controller hub that may be present in communications fabric 402.

Figure 5:
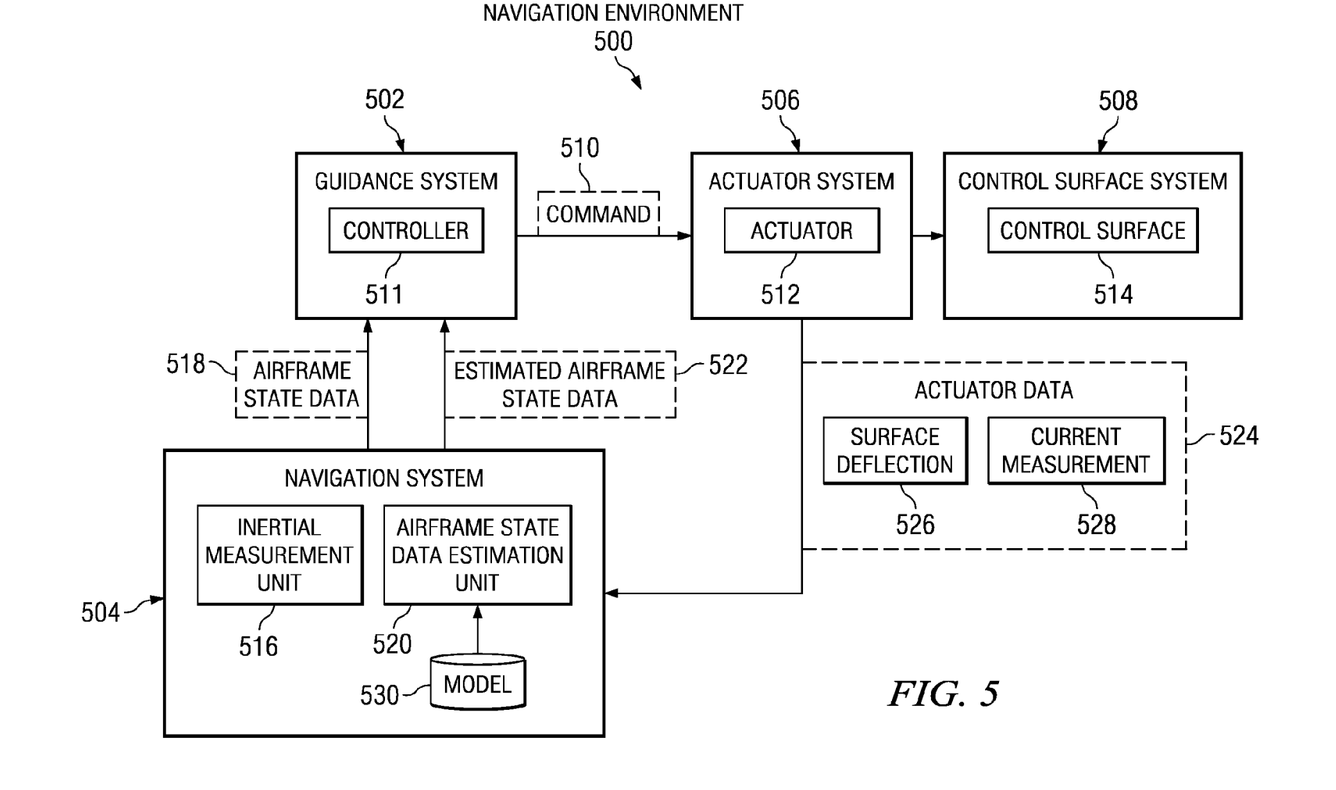
FIG. 5 is a diagram of a navigation environment in accordance with an advantageous embodiment.

With reference now to FIG. 5, a diagram of a navigation environment is depicted in accordance with an advantageous embodiment. Navigation environment 500 is an example of an environment that may be implemented in an aerial vehicle, such as aerial vehicle 100 in FIG. 1. In this example, navigation environment 500 includes guidance system 502, navigation system 504, actuator system 506, and control surface system 508.

Guidance system 502 and navigation system 504 may be implemented using a data processing system such as, for example, data processing system 400 in FIG. 4. Guidance system 502 includes controller 511, which generates command 510 to control actuator system 506. Controller 511 may be a software process.

In these illustrative examples, actuator system 506 may include actuators such as, for example, actuator 512. Actuator system 506 controls movement of control surface system 508 in response to command 510.

Control surface system 508 may include a number of control surfaces, such as control surface 514. These control surfaces may take various forms. For example, control surface 514 may be a flap, a rudder, a fin, a slat, a propulsion system valve, and/or any other suitable control surface. Movement of control surface system 508 controls the operation or flight of the aerial vehicle in these examples.

Navigation system 504 includes inertial measurement unit 516. Inertial measurement unit 516 generates airframe state data 518. Airframe state data 518 includes a number of airframe states and may be used by guidance system 502 to generate commands, such as command 510. In the different advantageous embodiments, an additional inertial measurement unit is unnecessary for redundancy in navigation system 504.

Instead, the different advantageous embodiments may employ airframe state data estimation unit 520. This component uses information from actuator system 506 to generate estimated airframe state data 522. Further, airframe state data estimation unit 520 may take the form of a software component. This type of implementation requires no additional weight and/or space for implementation.

Estimated airframe state data 522 may be used by guidance system 502 in the event that airframe state data 518 cannot be generated by inertial measurement unit 516. Further, estimated airframe state data 522 also may be used if airframe state data 518, as generated by inertial measurement unit 516, is considered to be unreliable. This determination of reliability may be made by comparing estimated airframe state data 522 to airframe state data 518 in these examples.

Airframe state data estimation unit 520 receives actuator data 524 from actuator system 506. In particular, actuator data 524 may be generated by an actuator such as, for example, actuator 512.

Actuator data 524 includes surface deflection 526 and current measurement 528 in these illustrative examples. Surface deflection 526 is a surface deflection for a control surface, such as control surface 514. As used in these illustrative examples, the term "deflection" is also referred to as "position". For example, a surface deflection may also be referred to as a surface position. In these examples, the position of actuator 512 may be the same as the position for control surface 514 if both components have angular positions. Surface deflection 526 is a position of control surface 514.

Current measurement 528 is a measurement of current flowing through actuator 512 in this particular example. Airframe state data estimation unit 520 uses actuator data 524 and model 530 to generate estimated airframe state data 522.

Model 530 is a model of the aerial vehicle and describes how the aerial vehicle behaves under a number of different flight conditions. For example, measured current, hinge moment, and other data may be input into model 530 to obtain estimated airframe state data 522.

Figure 6:
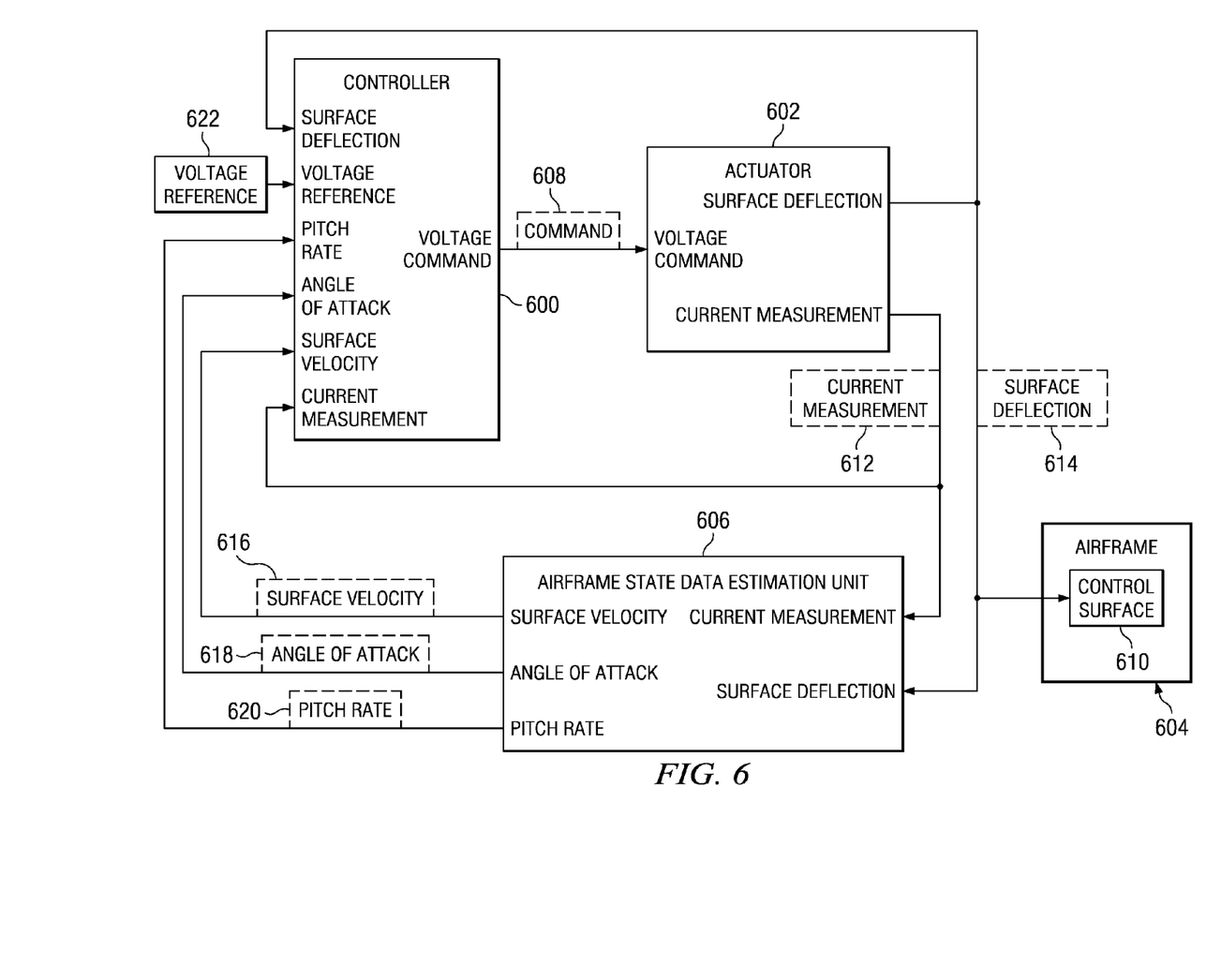
FIG. 6 is a diagram illustrating generation of estimated airframe state data in accordance with an advantageous embodiment.

With reference now to FIG. 6, a diagram illustrating generation of estimated airframe state data is depicted in accordance with an advantageous embodiment. In this example, controller 600, actuator 602, airframe 604, and airframe state data estimation unit 606 are illustrated.

Controller 600 is an example of a component that may be found in a guidance system, such as guidance system 502 in FIG. 5. Controller 600 may take the form of hardware and/or software. Actuator 602 is an example of one implementation for actuator 512 in FIG. 5. Airframe state data estimation unit 606 is an example of one implementation for airframe state data estimation unit 520 in FIG. 5.

Controller 600 generates command 608, which is sent to actuator 602. Command 608 also may be sent to airframe state data estimation unit 606. Command 608 results in actuator 602 changing the movement of airframe 604 by changing a position of control surface 610. Actuator 602 generates current measurement 612, which is sent to airframe state data estimation unit 606 and controller 600.

Additionally, actuator 602 generates surface deflection 614, which is sent to airframe state data estimation unit 606, controller 600, and control surface 610 within airframe 604. In these examples, airframe state data estimation unit 606 uses current measurement 612 and surface deflection 614 to generate estimated airframe state data containing airframe states for surface velocity 616, angle of attack 618, and pitch rate 620. This information is estimated data in these examples. This airframe state data is sent to controller 600, which uses the information to generate another command to actuator 602. Further, controller 600 also may generate command 608 in the form of a voltage level using voltage reference 622.

Figure 7:
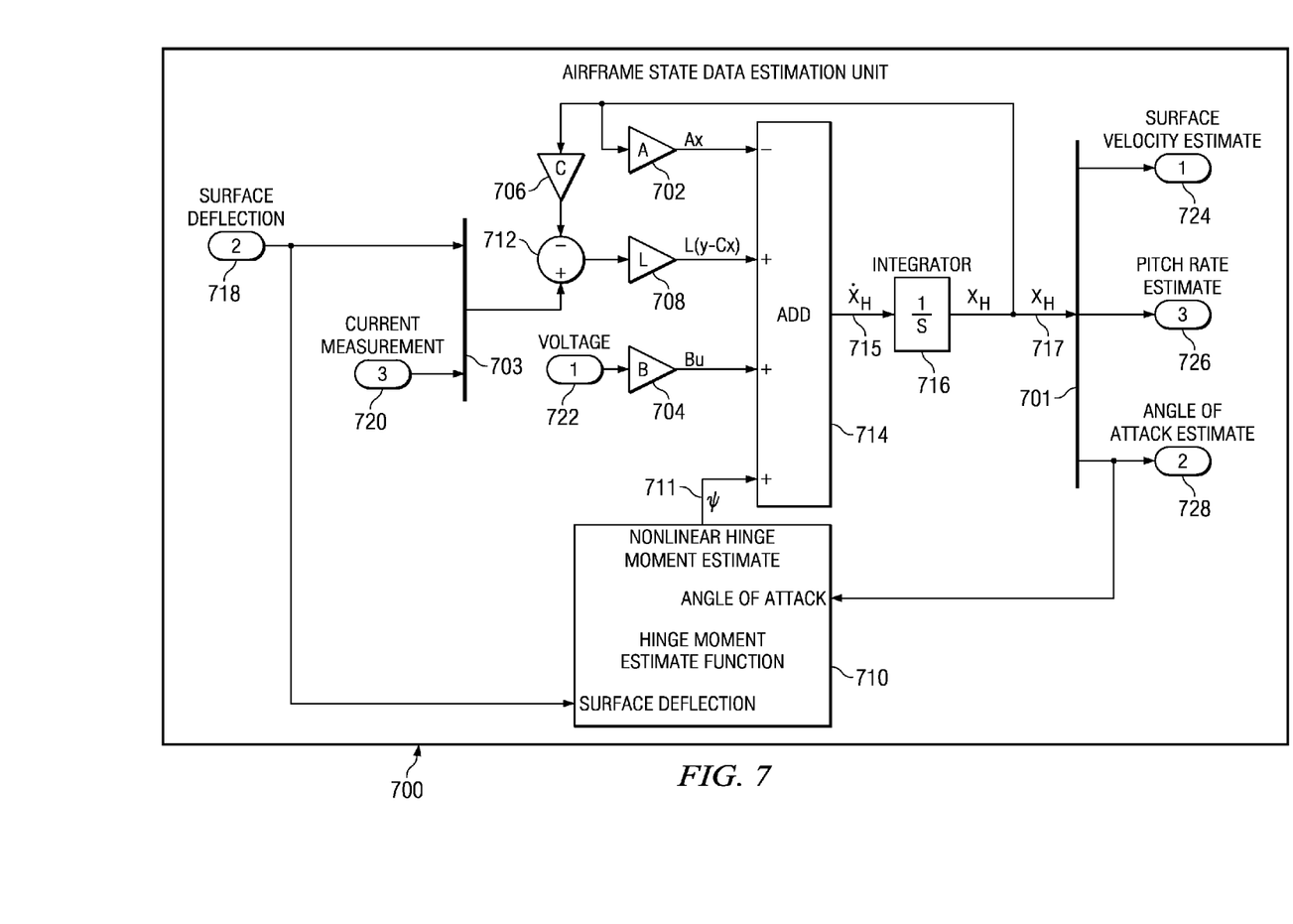
FIG. 7 is a diagram of an airframe state data estimation unit in accordance with an advantageous embodiment.

With reference now to FIG. 7, a diagram of an airframe state data estimation unit is depicted in accordance with an advantageous embodiment. In this example, airframe state data estimation unit 700 is an example of one implementation for airframe state data estimation unit 606 in FIG. 6.

In this example, airframe state data estimation unit 700 may include matrices A 702, B 704, C 706, and L 708. Airframe state data estimation unit 700 also may have hinge moment estimate function 710, subtraction unit 712, addition unit 714, and integrator 716. The output of matrix C 706 may be sent into subtractor unit 712. The output of matrix A 702, matrix B 704, and matrix L 708 may be sent to addition unit 714. The output of hinge moment estimate function 710 is nonlinear hinge moment estimate 711, $\Psi$, and is sent into the input of addition unit 714.

In these examples, addition unit 714 may sum 4 vector signals in the form of 5×1 matrices A 702, L 708, B 704, and nonlinear hinge moment estimate 711. A vector signal is a signal containing vector data, in which a vector may be an ordered collection of n elements in the form of either a 1×n matrix or an n×1 matrix in these examples. In other words, a vector is a matrix in which one of the dimensions equals one. The output of addition unit 714 is state derivative vector 715, $\dot{x}h$, and is connected to the input of integrator 716. The input of matrix A 702 and matrix C 706 is connected to the output of integrator 716. The output of integrator 716 may be state vector 717, $x_h$.

Airframe state data estimation unit 700 has surface deflection 718, current measurement 720, and voltage 722 as inputs. Airframe state data estimation unit 700 has surface velocity estimate 724, pitch rate estimate 726, and angle of attack estimate 728 as outputs. The output of integrator 716 is sent to element 701. Element 701 is an element that extracts individual signals from vector signals. Element 701 extracts three of the five estimated signals in state vector 717 to produce the outputs for airframe state data estimation unit 700. Surface deflection 718 and current measurement 720 are sent to element 703 as inputs for airframe state data estimation unit 700. Element 703 induces individual signals into vector signals. Element 703 induces surface deflection 718 and current measurement 720 into a vector signal for input into subtractor 712.

State vector 717 is defined for the longitudinal plane as an array of the airframe and actuator states angle of attack, pitch rate, surface deflection, surface deflection rate, and current. The input to the system is the voltage applied to the actuator. Since airframe state data estimation unit 700 has locally exponentially stable properties, the initial states of airframe state data estimation unit 700 can be arbitrarily chosen within the limits of the actuator and angle of attack sweep angles. Measurements are taken of the surface deflection and the actuator current and are used as inputs to surface deflection 718 and current measurement 720, respectively. State vector 717 is updated by adding the following four quantities:

1. The product of system parameter matrix A 702 and the initial state vector 717.
2. The product of input parameter matrix B 704 and voltage 722.
3. Nonlinear hinge moment estimate 711, $\Psi$, which is calculated by cubing the difference in angle of attack estimate 728 and surface deflection 718.
4. The product of system output matrix C 706 and the initial state vector 717 subtracted from the output measurements, surface deflection 718 and current measurement 720. This quantity is multiplied by a user selected gain, L.

The result of the four additions is then integrated to produce the next state vector 717 update, and the process is repeated with the new state vector 717 update acting as the initial state for state vector 717.

The controller output voltage is updated by subtracting the reference model states from the states for airframe state data estimation unit 700 and multiplying the quantity by a user selected gain, K. This quantity is then added to the feedforward reference voltage.

Figure 8:
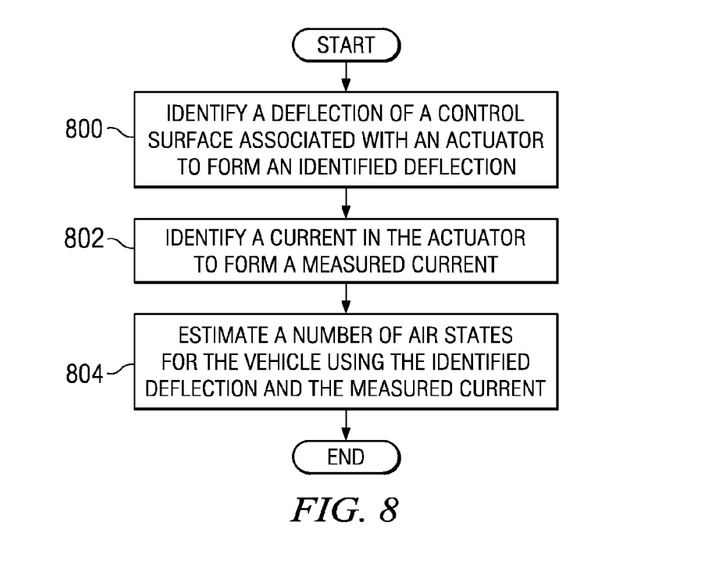
FIG. 8 is a flowchart of a process for identifying a number of air states for a vehicle in accordance with an advantageous embodiment.

With reference now to FIG. 8, a flowchart of a process for identifying a number of air states for a vehicle is depicted in accordance with an advantageous embodiment. The process illustrated in FIG. 8 may be implemented in a navigation environment such as, for example, navigation environment 500 in FIG. 5. More specifically, the process may be implemented within a software component, such as airframe state data estimation unit 520 in FIG. 5.

The process begins by identifying a deflection of a control surface associated with an actuator to form an identified deflection (operation 800). The process identifies a current in the actuator to form a measured current (operation 802). A number of air states is estimated for the vehicle using the identified deflection and the measured current (operation 804), with the process terminating thereafter.

The flowcharts and block diagrams in the different depicted embodiments illustrate the architecture, functionality, and operation of some possible implementations of apparatus, methods, and computer program products. In this regard, each block in the flowchart or block diagrams may represent a module, segment, or portion of computer usable or readable program code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

With reference back to FIG. 3, aerial vehicle 300 is an example of an aerial vehicle for which a navigation environment can be designed and implemented in accordance with an advantageous embodiment. In this illustrative example, the navigation environment is for a guided missile. Actuator dynamics, along with the nonlinear hinge moment induced by aerodynamic forces on the actuator surfaces, are taken into account.

It is assumed that the aerial vehicle tracks a predetermined angle of attack (AoA) reference trajectory. A solution to the output feedback tracking control problem is identified.

In these illustrative examples, a dynamic model augmented with an aerodynamic hinge moment bias from the flight control surface actuator is employed. Aerodynamic hinge moments are estimated using computational fluid dynamics (CFD) and modeled as a nonlinear, multivariable continuous function. The hinge moment bias contribution is shown to be locally Lipschitz within the actuator sweep angle for specified flight conditions. The overall system model is presented as separate linear and nonlinear components.

With a linear component, full-state feedback controller is designed with a sufficient condition under which exponential stabilization is achieved. This controller may be implemented as controller 600 in FIG. 6. With only an actuator position and a current output available for measurement, an airframe state data estimation unit is designed, and a sufficient condition is developed for exponential stability.

Although many guided munitions use inertial measurement unit measurements to predict inertial velocity, the modeling effort, in this illustrative example, assumes that the weapon velocity components can be acquired from an external tracking source, such as a fire control radar. Other implementations may employ a true velocity state.

Neglecting gravity for a given airspeed and altitude, the nonlinear, longitudinal equations of motion can be described by:

$$m\dot{\alpha}V_T = F_T\sin\alpha - L_A(\alpha, \delta) + mV_T q \quad (1)$$

$$\dot{q} = \frac{M(\alpha, \delta)}{I_{yy}}, \quad (2)$$

where $F_T$ is the propulsion force, $\alpha$ is the angle of attack and q is the pitch rate. The aerodynamic lift force, $L_A$, and pitching moment, M, are functions of $\alpha$ and actuator control surface angular deflection, $\delta$.

The constants $V_T$, M, and $I_{yy}$ represent the vehicle airspeed, mass, and pitch axis moment of inertia, respectively. For this example, the propulsion forces are assumed to be zero, and changes in the lift force and pitching moment are relatively linear within the flight envelope and can be linearized to give:

$$\dot{\alpha} = \frac{Z_\alpha}{V_T}\alpha + \frac{Z_\delta}{V_T}\delta + q \quad (3)$$

$$\dot{q} = M_\alpha \alpha + M_\delta \delta \quad (4)$$

where $Z_{(\cdot)}$, $M_{(\cdot)}$ are the corresponding acceleration and moment stability derivative constants relative to (•), respectively, and where (•) may be any variable such as, for example, $\alpha$ or $\delta$.

For most vehicles, $\delta$ is considered a "virtual" deflection and is resolved from an internal surface mixing strategy that incorporates multiple true fin deflections. In this example, the aerial vehicle was designed where virtual deflections and true deflections map one-to-one. The true control surface deflection is typically measured relative to the vehicle body axis coordinate system.

Figure 9:
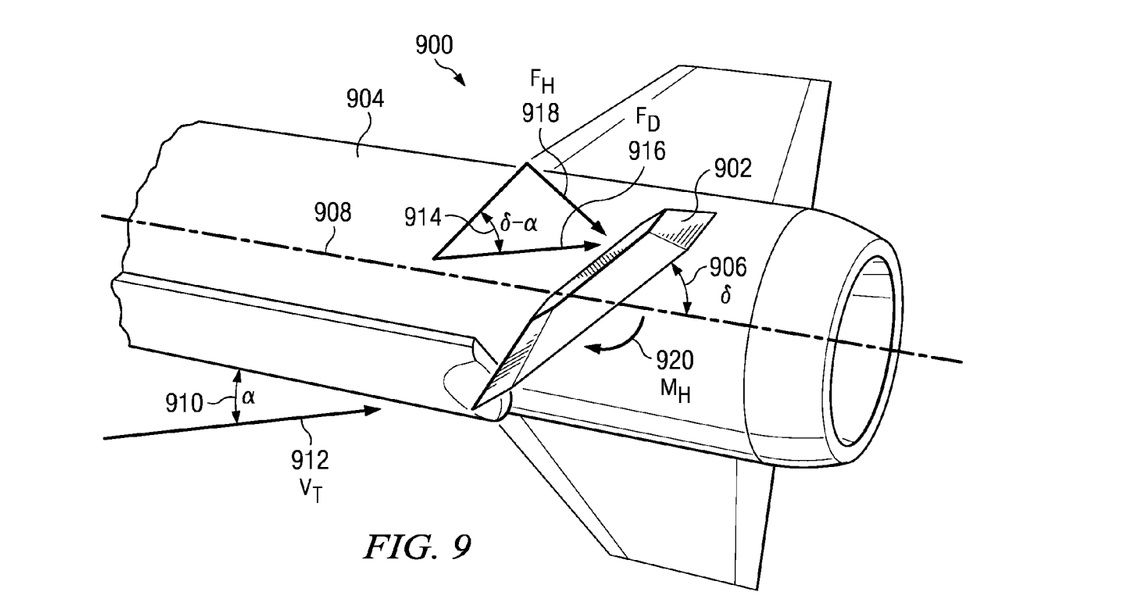
FIG. 9 is a diagram of a portion of an aerial vehicle illustrating surface deflection relative to a vehicle body axis coordinate system in accordance with an advantageous embodiment.

With reference to FIG. 9, a diagram of a portion of an aerial vehicle illustrating surface deflection relative to a vehicle body axis coordinate system is depicted in accordance with an advantageous embodiment.

Aerial vehicle 900, in this example, has control surface 902 on body 904. Angle 906, $\delta$, is measured relative to axis 908. Angle 910, $\delta$, is measured relative to line 912, $V_T$. Angle 914 is obtained by subtracting angle 910 from angle 906, which is $\delta-\alpha$. Line 916 represents aerodynamic drag force $F_D$. Line 918 represents hinge force, $F_H$. Arrow 920 represents hinge moment bias $M_H$. Axis 908 is the airframe body reference x-axis. Line 912 represents the airframe velocity vector direction. The angle $\delta$ is the angle of the control surface relative to the airframe body reference x-axis. The angle $\alpha$ is the angle of the airframe velocity vector relative to the airframe body reference x-axis.

Aerial vehicle 900 illustrates this convention and depicts the influence of an aerodynamic drag force, $F_D$, inducing an actuator hinge moment. The resulting hinge moment bias, $M_H$, is nonlinear, and a combined torque profile can be represented as a multivariable, continuous, scalar function, which can be deduced mathematically from FIG. 9 as:

$$M_H = F_D l_H \sin(\delta - \alpha) = \frac{1}{2}\rho V_T^2 S_H l_H \sin(\delta - \alpha) \quad (5)$$

where $\rho$ is the air density, and $l_H$, $S_H$ are an aerodynamic reference length and area, respectively.

Figure 10:
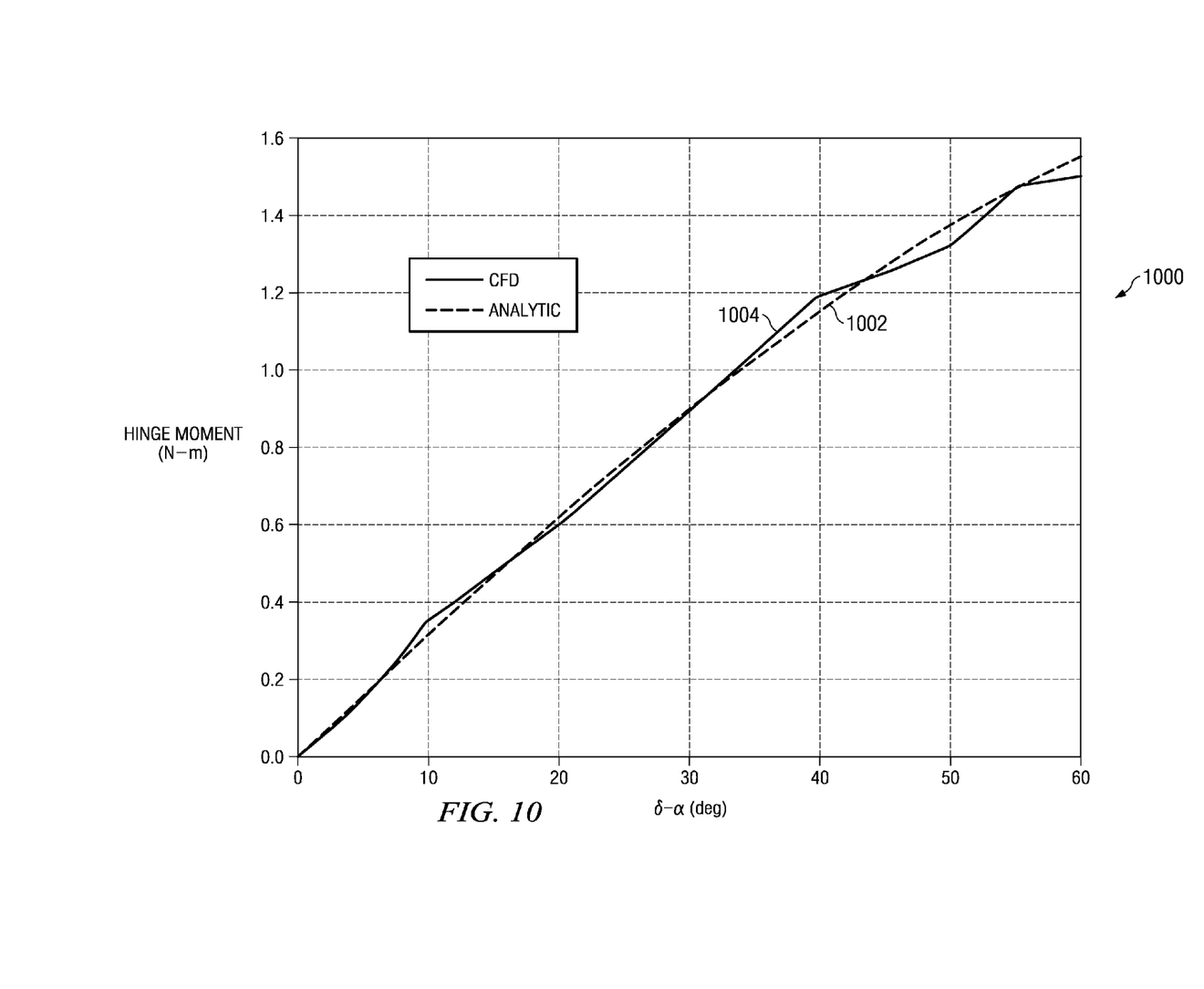
FIG. 10 is a graph of an aerodynamic hinge moment bias as a function of the airframe state data in accordance with an advantageous embodiment.

In FIG. 10, a graph of an aerodynamic hinge moment bias is depicted in accordance with an advantageous embodiment. In graph 1000, the x-axis is angle 914, $\delta-\alpha$ in FIG. 9. The y-axis is hinge moment. In graph 1000, line 1002 represents the hinge moment computed using equation (5), and line 1004 represents a computational fluid dynamics approximation of the hinge moment.

More complex geometries will invariably produce more complex airflows. Therefore, the relationship in equation (5) will not necessarily hold for all configurations. With these situations, other methods, such as polynomial curve-fitting or piece-wise approximations, may be used.

With aerial vehicle 900 in FIG. 9, control surface 902 in FIG. 9 is electro-mechanically actuated and can be modeled as a linear direct current motor. The nonlinear hinge moment bias component enters as an external disturbance. Assigning a convention where the hinge moment bias opposes the internal actuator torque when positive current is applied, the mechanical dynamics of the flight control actuator can be represented as:

$$J\ddot{\delta} = K_t i - M_H(\alpha,\delta) \quad (6)$$

where i is the applied current, and J and $K_t$ are the system inertia and motor torque constant, respectively. The electrical circuit dynamics of the actuator are described by:

$$V_s = Ri + L\frac{di}{dt} + V_b \quad (7)$$

where R and L are the coil resistance and inductance, respectively, $V_b = K_t \dot{\delta}$ is the back electro-motive force, and $V_s$ is the supply voltage control input signal. Combining equations (3)-(7) and choosing the states as $[\alpha q \delta \dot{\delta} i] = [x_1 x_2 x_3 x_4 x_5]$ gives the state-space representation $$\dot{x}_1 = \mu_1 x_1 + x_2 + \mu_2 x_3$$

$$\dot{x}_2 = M_\alpha x_1 + M_\delta x_3$$

$$\dot{x}_3 = x_4$$

$$\dot{x}_4 = \mu_3[K_t x_5 - M_H(x_1,x_3)]$$

$$\dot{x}_5 = \mu_4(-K_t x_4 - R x_5 + u) \quad (8)$$

where $$\mu_1 = \frac{Z_\alpha}{V_T}, \mu_2 = \frac{Z_\delta}{V_T}, \mu_3 = \frac{1}{J}, \mu_4 = \frac{1}{L}.$$

This state-space representation may be state derivative vector 715 in FIG. 7. The states chosen may be the states within state vector 717 in FIG. 7.

Angle-of-attack is typically computed from inertial measurement quantities and subsequently fed back to the flight control algorithm for tracking error computation. However, lacking a valid measurement of inertial quantities, only the surface actuator position and current are considered legitimate outputs $$y_1 = x_3, y_2 = x_5. \tag{9}$$

Although a global representation of the hinge moment bias is not required, the anticipated flight conditions could conceivably result in the quantity $(\delta-\alpha) > \pi/6$. Therefore, a linear approximation would be insufficient. Including the second term in an infinite series approximation of $\sin(\delta-\alpha)$ and defining $\mu_H = \frac{1}{2}\rho V_T^2 S_H l_H$ from (5) gives $$\hat{M}_H = \mu_H \left[ (\delta - \alpha) - \frac{1}{6}(\delta - \alpha)^3 \right] \tag{10}$$

By redefining the hinge moment bias as $$\psi = \hat{M}_H - \mu_H(\delta - \alpha) \tag{11}$$

equation (8) can be rewritten as $$\dot{x} = Ax + Bu + \Psi$$

$$y = Cx \tag{12}$$

where $$A = \begin{bmatrix} \mu_1 & 1 & \mu_2 & 0 & 0 \\ M_\alpha & 0 & M_\delta & 0 & 0 \\ 0 & 0 & 0 & 1 & 0 \\ \mu_3\mu_H & 0 & -\mu_3\mu_H & 0 & \mu_3 K_t \\ 0 & 0 & 0 & -\mu_4 K_t & -\mu_4 R \end{bmatrix} \tag{13}$$

$$B^T = [0\ 0\ 0\ 0\ \mu_4]$$

$$B_\psi^T = \left[ 0\ 0\ 0\ -\frac{\mu_3\mu_H}{6}\ 0 \right]$$

$$C = \begin{bmatrix} 0 & 0 & 1 & 0 & 0 \\ 0 & 0 & 0 & 0 & 1 \end{bmatrix}$$

and $$\|\Psi(x_a) - \Psi(x_b)\| \leq \gamma \|x_a - x_b\|.$$

In these examples, the hinge moment bias in (11) may be nonlinear hinge moment estimate 711 in FIG. 7.

In these examples, $\Delta_{max} = \|\delta - \alpha\|_\infty$. For a given airspeed and altitude, the nonlinearity, $\Psi$, is locally Lipschitz, with constant $\gamma$, within the set of all possible angle of attack and actuator angular positions of the flight envelope $$\|\Psi(x_a) - \Psi(x_b)\| \leq \gamma \|x_a - x_b\|$$

$$\forall x_a, x_b \in X X := \{x \in R^5 | 0 \leq |x_3 - x_1| \leq \Delta_{max}\}. \tag{14}$$

A controller tracks a predetermined angle of attack reference trajectory. The predetermined reference trajectory, $x_r$, can be selected to satisfy a reference model with a desired dynamic performance corresponding to $$\dot{x}_r = Ax_r + Bu_r + \Psi(x_r). \tag{15}$$

Although angle of attack and pitch rate are tracked, the output vector from (12) only provides actuator position and current measurement. Therefore, an output feedback tracking controller is required.

In these examples, $A \in C^{n \times n}$ is stable in the sense that all eigenvalues have negative real parts. Then $$\delta_s(A) = \min_{\omega \in R} \sigma_{min}(A - j\omega I) \tag{16}$$

is the distance to the set of unstable matrices where $\sigma_{min}(A-j\omega I)$ is the minimum singular value of $(A-j\omega I)$, $\forall \omega \in R$.

Lemma 1: Consider the Algebraic Riccati Equation (ARE)

$$A^*P + PA + PP + \rho I = 0$$

and associated Hamiltonian matrix $$H = \begin{bmatrix} A & I \\ -\rho I & -A^* \end{bmatrix}$$

where $\rho > 0$ and A is Hurwitz. If $\sqrt{\rho} < \delta_s(A)$, then H is hyperbolic (all eigenvalues of H have nonzero real parts) and there exists a unique $P = P^T > 0$, which is the solution to the ARE. It follows that $s = j\omega$ is an eigenvalue of H if the matrix $$[(A-j\omega I)^*(A-j\omega I) - \rho I]$$

is singular. Noting from (16) that $\delta_s^2(A)I \leq (A-j\omega I)^*(A-j\omega I)$, the eigenvalues of H will always have non-zero real parts if $\delta_s^2(A) - \rho > 0$ or $\sqrt{\rho} < \delta_s(A)$.

In order to fulfill the angle of attack tracking requirement and manage the hinge moment nonlinearity, an output feedback controller consisting of a linear state feedback control law coupled with an airframe state estimation unit are used.

In this example, the system is given by (12) with nonlinearity defined by (14). The output tracking control law $$u = L_{\dot{x}_5} r + Rx_5 r + K_t x_{4r} - K_c \hat{e} \tag{17}$$

with $\hat{e} = \hat{x} - x_r$ and nonlinear observer $$\dot{\hat{x}} = A\hat{x} + Bu + \Psi(\hat{x}) + L_o(y - C\hat{x}) \tag{18}$$

where $K_c$, $L_o \in R^5$ are gain vectors chosen such that $A_c = A - BK_c$ and $A_o = A - L_o C$ are Hurwitz, renders the tracking error dynamics $$\dot{e} = A_c e + \Psi(x) - \Psi(x_r), e = x - x_r \tag{19}$$

and observer error dynamics $$\dot{\tilde{x}} = A_o \tilde{x} + \Psi(x) - \Psi(\hat{x}), \tilde{x} = x - \hat{x} \tag{20}$$

exponentially stable for all $x \in X$ if $$\gamma < \delta_s(A_c) \text{ and } \gamma < \delta_s(A_o). \tag{21}$$

Substituting (17) into (8) gives $$\dot{e} = A_c e + B_c K_c \tilde{x} + \Psi(x) - \Psi(x_r) \tag{22}$$

Consider a Lyapunov function candidate $$V(e, \tilde{x}) = \xi e^T P_c e + \tilde{x}^T P_o \tilde{x} \tag{23}$$

where $\xi$ is a positive constant and $P_c$, $P_o \in R^{5 \times 5}$ are symmetric, positive definite. Taking the time derivative of (23) yields $$\dot{V}(e, \tilde{x}) = \xi\{e^T(A_c^T P_c + P_c A_c)e + 2e^T P_c[\Psi(x) - \Psi(x_r)] + 2e^T P_c B_c K_c \tilde{x}\} +$$
$$\tilde{x}^T[A_o^T P_o + P_o A_o]\tilde{x} + 2_{\tilde{x}^T} P_o[\Psi(x) - \Psi(\hat{x})] \le$$
$$\xi\{e^T(A_c^T P_c + P_c A_c)e + 2\gamma\|P_c e\|\|e\| + 2P_c B_c K_c\|e\|\|\tilde{x}\|\} +$$
$$\tilde{x}^T(A_o^T P_o + P_o A_o)\tilde{x} + 2\gamma\|P_o \tilde{x}\|\|\tilde{x}\| \le$$
$$\xi\{e^T(A_c^T P_c + P_c A_c + P_c P_c + \gamma^2 I)e + 2P_c B_c K_c\|e\|\|\tilde{x}\|\} +$$
$$\tilde{x}^T(A_o^T P_o + P_o A_o + P_o P_o + \gamma^2 I)\tilde{x}$$

Now, for any $\eta_c,\eta_o>0$, there exist symmetric, positive definite $P_c$, $P_o$ such that $$A_c^T P_c + P_c A_c + P_c P_c + \gamma^2 I = -\eta_c I \quad (24)$$

$$A_o^T P_o + P_o A_o + P_o P_o + \gamma^2 I = -\eta_o I \quad (25)$$

are hyperbolic. From (21) in the hypothesis, consider the continuous function $f(\gamma) = \gamma^2 - \delta_s^2(A_c) < 0$. Since $f$ is continuous, there exists $\eta > 0$ such that $$f(\gamma) = \gamma^2 + \eta_c - \delta_s^2(A_c) < 0 \text{ or } \sqrt{\gamma^2 + \eta_c} < \delta_s(A_c)$$

A similar continuity argument can be made regarding the observer resulting in $\sqrt{\gamma^2 + \eta_o} < \delta_s(A_o)$. Therefore, the Hamiltonian matrices, $H_c$ and $H_o$, are hyperbolic from Lemma 1, and it follows from (24) and (25) that $$\dot{V}_c(e,\tilde{x}) \le -\xi\eta_c\|e\|^2 + 2\xi P_c B_c K_c\|e\|\|\tilde{x}\| - \eta_o\|\tilde{x}\|^2 \quad (26)$$

Defining $$\xi_c = 2\|P_c B_c K_c\|, \xi = \frac{\eta_c \eta_o}{\xi_c^2},$$

and noting $$\left(\frac{1}{\sqrt{2}} \frac{\eta_c \sqrt{\eta_o}}{\xi_c}\|e\| - \frac{1}{\sqrt{2}}\sqrt{\eta_o}\|\tilde{x}\|\right)^2 \ge 0 \quad (27)$$

gives $$\dot{V}(e,\tilde{x}) \le -\xi\eta_c\|e\|^2 + \xi\xi_c\|e\|\|\tilde{x}\| - \eta_o\|\tilde{x}\|^2 \le \quad (28)$$
$$-\frac{\eta_c^2 \eta_o}{\xi_c^2}\|e\|^2 + \frac{\eta_c \eta_o}{\xi_c}\|e\|\|\tilde{x}\| - \eta_o\|\tilde{x}\|^2 \le -\frac{1}{2}\left(\frac{\eta_c^2 \eta_o}{\xi_c^2}\|e\|^2 + \eta_o\|\tilde{x}\|^2\right).$$

Therefore, $V(e,\tilde{x})$ is a Lyapunov function and $e,\tilde{x} \to 0$ exponentially as $t \to \infty$.

In the depicted example, the number $\delta_s$ is realization dependent. Therefore, a coordinate transformation, $x'=Tx$, can be used to reduce the value of $\gamma$ and increase $\delta_s$. When using standard SI units, the actuator inertia is typically very small relative to $K_t$, R, and L resulting in large values of $\mu_3$. A similarity transformation $e'=Te$ where $$\|T^{-1}\psi(Tx_a) - T^{-1}\psi(Tx_b)\| \le \gamma'\|x_a - x_b\| \quad (29)$$

can be used to produce a new Lipschitz constant where $\gamma' < \gamma$.

Full-state reference trajectories are provided to the controller. For output $\alpha$, the relative degree of the full state system (8) is four and, therefore, four differentiations of the output are required to compute a desired feedforward reference trajectory. For a given set of desired initial and final boundary conditions on $\alpha$, a polynomial interpolation method [6] was used to produce smooth, continuous trajectories in $\alpha$ and corresponding derivatives. Given the desired initial and final values of $\alpha$, an equilibrium could be calculated using (4) to determine the initial and final values of $\delta$ required to trim the vehicle. The actuator deflection trajectory dynamics can then be computed from $$\mu_2\ddot{\delta} = -M_\delta\delta + \ddot{\alpha} - \mu_1\dot{\alpha} - M_\alpha\alpha \quad (30)$$

Once the differential equation (30) is solved for $\delta$, the remaining derivatives $\dot{\delta},\ddot{\delta},\dddot{\delta}$ can be found analytically by two more differentiations of (30) and using $\alpha,\alpha^{(4)}$. Now that all derivatives in $\alpha$ and $\delta$ are known, q and i can be determined from (3) and (6), respectively. Differentiating (6), solving for di/dt, and substituting into (7) results in the feedforward control voltage reference $$V_s^{ff} = \mu_H K_t L\left[\cos(\delta-\alpha)(1-\alpha)\ddot{\delta} + \cos(\delta-\alpha)(\dot{\delta}-1)\dot{\alpha} + \dddot{\delta}\right] + K_t\dot{\delta} + Ri \quad (31)$$

The process described above is capable of being discretized and solved in real-time within a navigation environment, such as navigation environment 500 in FIG. 5. In these illustrative examples, equation (17) may be implemented in controller 600 in FIG. 6. Equation (18) may be implemented in airframe state data estimation unit 520 in FIG. 5.

Thus, the different advantageous embodiments provide a method and apparatus for identifying a number of air states for a vehicle. The number of air states may be identified based on a deflection of a control surface associated with an actuator and a measured current for the actuator. With the estimated air states, currently measured air states from another source may be verified to determine whether those air states are valid.

Further, these estimated air states may be used in case the currently measured air states become invalid or are no longer available. This estimation of the number of air states for a vehicle may be performed without requiring additional weight and expense for normally used redundancy components. For example, if an inertial measurement unit is used to provide air state data, a second inertial measurement unit may be unnecessary. As a result, the weight and expense of the second inertial measurement unit may be avoided.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer-usable or computer-readable medium providing program code for use by, or in connection with, a computer or any device or system that executes instructions. For the purposes of this disclosure, a computer-usable or computer-readable medium can generally be any tangible apparatus that can contain, store, communicate, propagate, or transport the program for use by, or in connection with, the instruction execution system, apparatus, or device.

The computer-usable or computer-readable medium can be, for example, an electronic, magnetic, optical, electromagnetic, infrared, or semiconductor system, or a propagation medium. Non-limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for identifying a number of air states for a vehicle, the method comprising:
   identifying a deflection of a control surface associated with an actuator to form an identified deflection;
   identifying a current in the actuator to form a measured current; and
   estimating by a processor device the number of air states for the vehicle using the identified deflection and the measured current.

2. The method of claim 1 further comprising:
   generating a command to the actuator using the number of air states.

3. The method of claim 1 further comprising:
   estimating a hinge moment for the control surface using the deflection of the control surface and an estimated angle of attack.

4. The method of claim 1, wherein the number of air states is an estimated number of states and further comprising:
   comparing the estimated number of states to another set of air states to form a comparison; and
   determining whether the another set of air states is valid using the comparison.

5. The method of claim 4, wherein another set of air states is generated by an inertial measurement unit.

6. The method of claim 1, wherein the number of air states comprises at least one of a number of air states for a longitudinal plane, a number of air states for a lateral plane, and a number of air states for a directional plane.

7. The method of claim 1, wherein the number of air states comprises at least one of an angle of attack, a pitch rate, a surface velocity, a position rate, a roll, a heading, a pitch attitude angle, a roll rate, a side slip, a yaw, and a yaw rate.

8. The method of claim 1, wherein the deflection of the control surface is an angular position of the control surface.

9. The method of claim 8, wherein the angular position of the control surface is derived from a position of the actuator.

10. The method of claim 1, wherein the vehicle is selected from one of an aircraft, a surface ship, a personnel carrier, a train, a spacecraft, a missile, an unmanned aerial vehicle, a submarine, a bus, and an automobile.

11. An apparatus comprising:
    an actuator; and
    an air state estimation process capable of receiving a deflection of a control surface associated with the actuator from the actuator to form an identified deflection; receiving a current measurement identifying a current in the actuator to form a measured current; and estimating a number of air states for the vehicle using the identified deflection and the measured current.

12. The apparatus of claim 11 further comprising:
    the control surface.

13. The apparatus of claim 11 further comprising:
    a controller capable of generating a command for the actuator using the number of air states.

14. The apparatus of claim 11 further comprising:
    a vehicle, wherein the actuator and the air state estimation process are located in the vehicle.

15. The apparatus of claim 14, wherein the vehicle is selected from one of an aircraft, a surface ship, a personnel carrier, a train, a spacecraft, a missile, an unmanned aerial vehicle, a submarine, a bus, and an automobile.

16. The apparatus of claim 11, wherein the number of air states comprises at least one of a number of air states for a longitudinal plane, a number of air states for a lateral plane, and a number of air states for the directional plane.

17. The apparatus of claim 11, wherein the number of air states comprises at least one of an angle of attack, a pitch rate, a surface velocity, a position rate, a roll, a heading, a pitch attitude angle, a roll rate, a side slip, a yaw, and a yaw rate.

18. The apparatus of claim 11, wherein the deflection of the control surface is an angular position.

19. The apparatus of claim 18, wherein the angular position of the control surface is derived from a position of the actuator.

20. A computer program product for identifying a number of air states for a vehicle, the computer program product comprising:
    a non-transitory computer recordable storage medium;
    program code, stored on the computer recordable storage medium, for identifying a deflection of a control surface associated with an actuator to form an identified deflection;
    program code, stored on the computer recordable storage medium, for identifying a current in the actuator to form a measured current; and
    program code, stored on the computer recordable storage medium, for estimating the number of air states for the vehicle using the identified deflection and the measured current.

* * * * *